Feb. 4, 1936.  W. N. BOLLER  2,029,287
MECHANISM FOR BRAKES AND CLUTCHES
Filed May 20, 1935   2 Sheets-Sheet 1
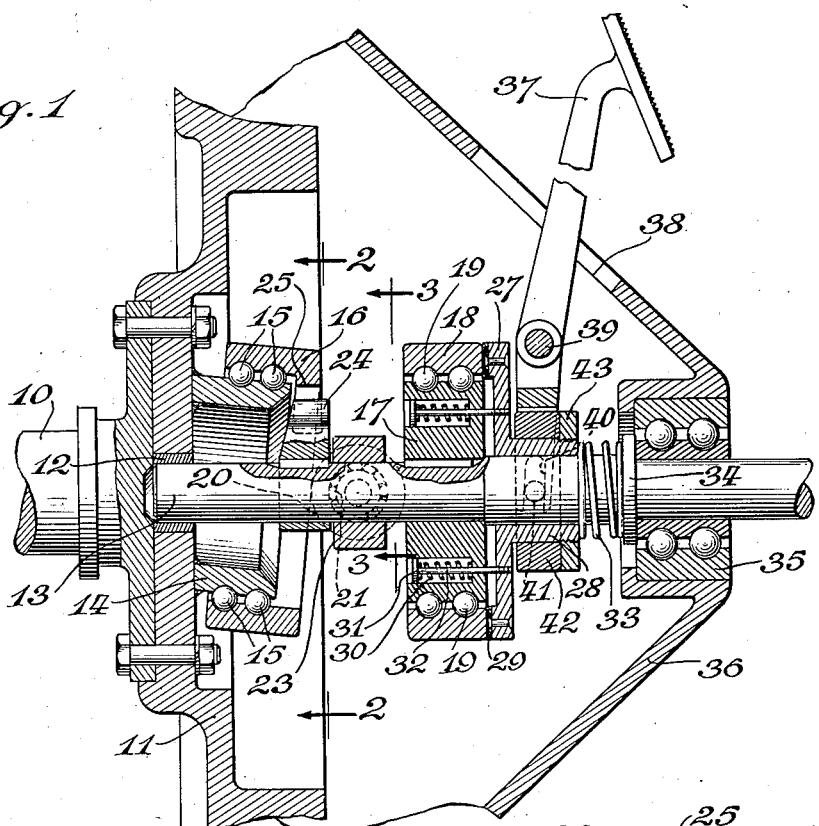
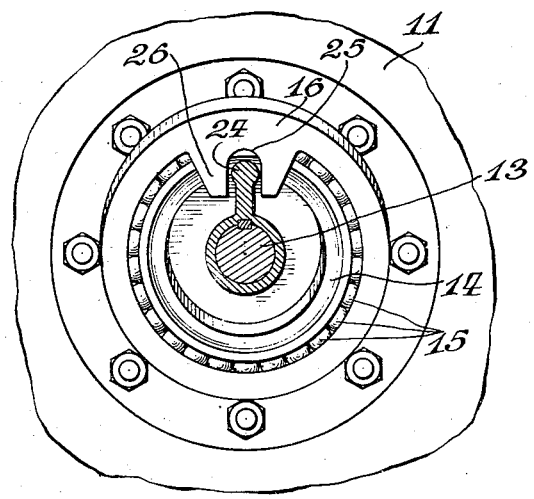
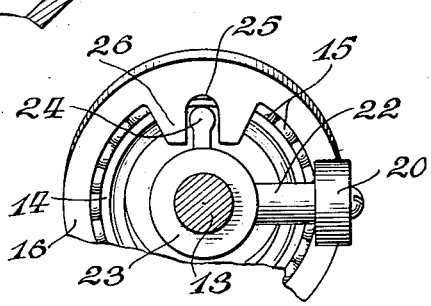
Inventor:
William N. Boller
BY Williams, Bradbury, McCaleb & Hinkle
Attys.

Feb. 4, 1936. W. N. BOLLER 2,029,287
MECHANISM FOR BRAKES AND CLUTCHES
Filed May 20, 1935 2 Sheets-Sheet 2
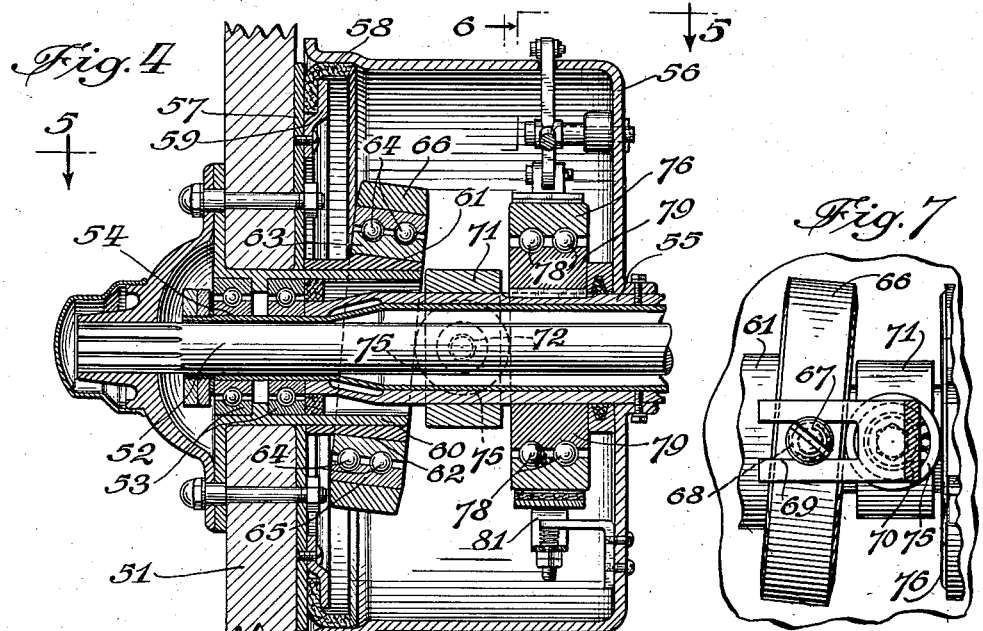
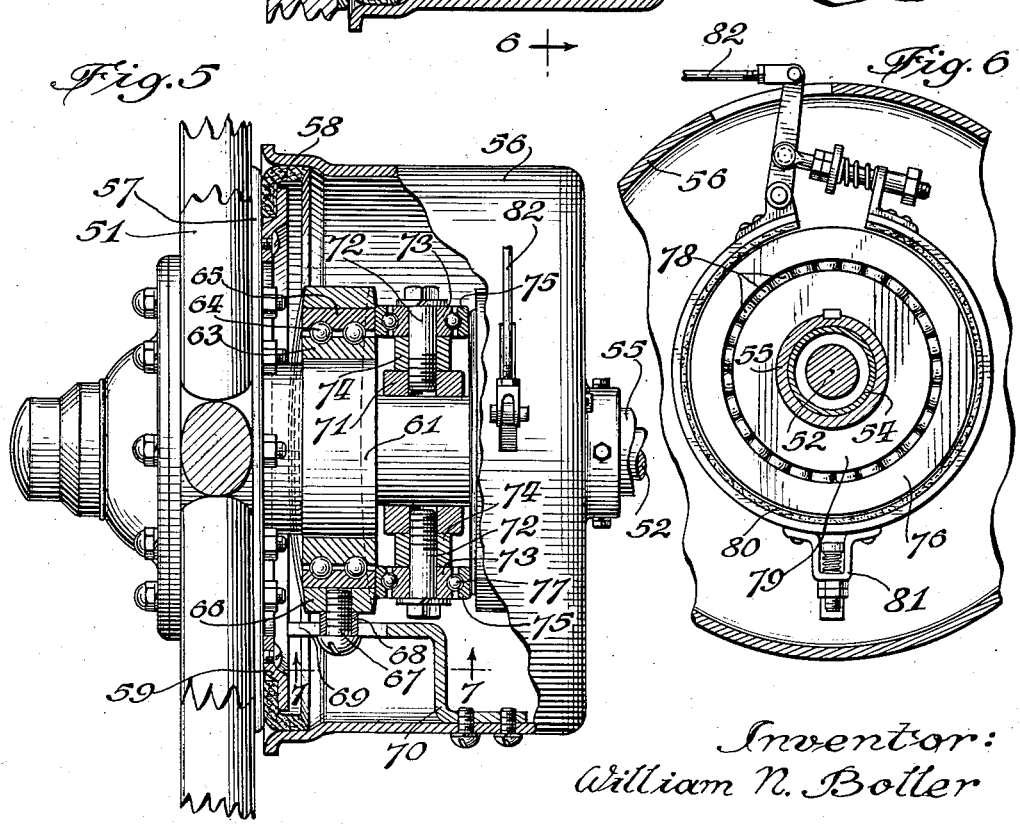
Inventor:
William N. Boller
By Williams, Bradbury, McCaleb + Hinkle
Attys.

Patented Feb. 4, 1936

2,029,287

UNITED STATES PATENT OFFICE 2,029,287

MECHANISM FOR BRAKES AND CLUTCHES

William N. Boller, Oak Park, Ill., assignor to Peter Boller Machine Works, Chicago, Ill., a corporation of Illinois Application May 20, 1935, Serial No. 22,361

9 Claims. (Cl. 188—2)

This invention relates to mechanism for brakes and clutches and has for its principal object the provision of a structure which can be actuated and controlled by a relatively slight pressure.

My invention utilizes a jamming or binding effect produced upon an intermediate member by two adjacent rotatable elements mounted upon axes at a slight angle. If one of the elements is rotating, then it tends to draw or wedge the intermediate member between the elements. If the second element is free to rotate, it will do so but a very slight pressure applied to it will act to brake the whole mechanism, or if the pressure means mounted on a further rotatable member, that member will be driven. In practice I prefer to mount the intermediate member and adjacent elements for free rotation, so that release of the jamming action occurs immediately the appropriate releasing actuation is made.

Essentially the brake and clutch are devices for the same purpose. The function of both devices is to make one element fast or immovable relative to another element. The difference is usually that in a clutch both elements move, whereas in the case of a brake, one element is stationary and a result of the application of the brake is to bring the other element into a position of rest. My improved structure is readily adapted for both purposes, as will fully appear from the following detailed descriptions of preferred embodiments of the invention shown in the accompanying drawings, in which Figure 1 is a fragmentary sectional view through a clutch housing, showing a clutch in which is embodied the present invention;

Fig. 2 is a sectional detail view taken on the line 2—2 of Fig. 1;

Fig. 3 is a sectional detail view taken on the line 3—3 of Fig. 1;

Fig. 4 is a fragmentary sectional view showing an automobile brake which embodies the invention;

Fig. 5 is a sectional view taken on the broken line 5—5 of Fig. 4;

Fig. 6 is a fragmentary sectional view taken on the line 6—6 of Fig. 4, and

Fig. 7 is a sectional detail view taken on the line 7—7 of Fig. 5.

Referring to Figs. 1, 2 and 3 of the drawings, the reference numeral 10 designates the crank shaft of an automobile, which crank shaft is secured by bolts to a fly wheel 11. The fly wheel is provided at its center with a bearing 12 for a propeller shaft 13. Around the propeller shaft is located a ring 14 which constitutes the inner race for balls 15. The ring 14 is secured to the rear face of the fly wheel 11, for example by welding, and it is located at a slight angle to the axial direction of the crank shaft 10 and propeller shaft 13. The deviation from this direction is preferably less than 10 degrees. I prefer to employ a deviation of approximately 7 degrees. The outer race element 16 rotates freely upon the balls 15 and is prevented from axial movement relative to the ring 14 by these balls, in the manner well known with ball bearings.

Upon the shaft 13 I rigidly mount an inner race member 17 which carries an outer race member 18. The race members 17 and 18 are connected and are held against relative axial movement by means of the balls 19. The elements 17 and 18 are mounted truly upon the shaft 13 so that the adjacent faces of the members 16 and 18 are located at a slight angle, being the same angle referred to above, which in the present case is approximately 7 degrees. The distance between these two faces is relatively small, as shown in Fig. 1, so that a roller 20 may engage these faces at a position preferably approximately half way between the positions of minimum and maximum distance between the faces.

The roller 20 may suitably be mounted by means of balls 21 upon an arm 22 which projects radially from a collar 23 which is freely mounted upon the shaft 13 between the elements 16 and 18. Forward of the collar 23 the shaft 13 has keyed thereon a radial finger 24 which extends into an opening 25 formed in an inwardly projecting tongue 26 of the element 16. As a result of this connection the element 16 rotates with the shaft 13 and does not rotate when the shaft 13 is at rest. When, however, the shaft 10 is rotating, the element 16 moves or swings owing to the conical movement of its axis, the same being oblique with respect to the shaft 10. As a result of this precession-like movement of the element 16, it tends to chase the roller 20 before it in the direction of rotation of the shaft 10, that is, the clockwise direction as viewed in Figs. 2 and 3. The element 16 engages the roller 20 in less than one revolution of the shaft 10, and in the present construction in not more than one-half a revolution of that shaft. As a consequence of this engagement, the roller rotates upon the element 16 and its frictional contact with the element 18 causes that element to rotate.

I have found that a very slight force applied to the element 18 causes a slight but powerful jamming action of the roller 20 between the elements 16 and 18. The result of this slight force is to prevent relative movement between the elements 16, 20 and 18. As a result, the element 16 is prevented from oscillating relative to the shaft 10 and all that the shaft 10 can do with this locked system is to carry it around on the common axis of the shafts 10 and 13. The final result is that the drive of the shaft 10 is communicated directly to the shaft 13 through the rigid finger 24. The slight braking force can very readily be applied to the element 18 in the manner shown in Fig. 1.

The braking element comprises a disc 27 provided with a central collar 28 whereby it is slidably mounted on the shaft 13 remote from the roller 20. The disc 27 is provided with an annular friction pad 29 which is adapted to engage the rear face of the element 18. The disc 27 is normally held in braking relation with respect to the member 18 by means of springs 30 located in openings in the members 17, which springs abut against the heads 31 of pins 32 which extend rearwardly from the disc 27. The clutching effect can also be aided by means of a coil spring 33 located around the shaft 13 and abutting against the end of the collar 28 against a flange 34 upon the shaft 13. The shoulder 34 abuts against the bearing 35 of the shaft 13, which bearing is mounted in the clutch housing 36.

For the actuation of the clutch I provide a foot pedal 37 which extends through a slot 38 in the clutch housing 36. The pedal is pivotally mounted on a rod 39 within this housing and at its lower end is provided with slotted furcations 40 which engage pins 41 on the slip ring 42. The slip ring 42 is secured upon the sleeve 28 by means of a nut 43.

It will readily be appreciated that a very slight pressure to the foot pedal 37 will cause the disc 27 to be drawn rearwardly slightly, with the result that no force impedes the free movement of the element 18 upon the balls 19. Consequently the jamming or wedging effect resulting from the gyratory movement of the element 16, as a result of its axis following the conical form, is fully relieved by the free rotation of the roller 20 and the resulting free rotation of the element 18. When the pedal 37 is released, the braking effect is immediately re-exerted upon the member 18, with the result described above that the elements 16, 20 and 18 bind together as a rigid unit which is rotated with the shaft 10 and which communicates the drive of that shaft directly to the shaft 13.

Referring to Figs. 4, 5, 6 and 7, which illustrate the embodiment of the invention in the form of an automobile brake, the reference numeral 51 indicates a rear wheel of the automobile. The reference numeral 52 indicates the axle on which the wheel 51 is mounted. The thrust of the wheel is applied through bearings 53 to a sleeve 54 which is rigid with and projects from the rear axle housing 55. The brake mechanism is contained within a drum 56 rigidly mounted at its inner end upon the rear axle housing 55. The drum 56 is open adjacent the wheel 51 and the wheel comprises an inner plate 57 which normally closes the drum. I provide around the edge of the plate 57 an annular packing element 58 which engages the inner edge of the drum 56 and maintains an oil-proof seal therewith. The packing element 58 may suitably be an annular strip of leather or the like secured to the plate 57 by an annular clamping element 59.

The hub of the wheel 51 comprises a sleeve 60 which projects into the drum 56 around the rear axle housing 55. The sleeve 60 rigidly carries a sleeve 61 which is provided with an annular surface 62 slightly oblique to the axis of the axle 52. The degree of obliquity, as in the previously described embodiment, is preferably less than 10 degrees, and may suitably be of the order of 7 degrees. Upon the element 51 is forced or otherwise rigidly mounted the inner race 63 of balls 64. The balls 64 cooperate with an outer race 65 upon which is rigidly mounted an annular member 66. This annular member receives a screw 67 upon which is rotatably mounted a collar 68. The screw 67 and collar 68 project into a slot 69 in an angular bracket 70.

The angular bracket 70 is rigidly mounted upon the interior of the drum 56 so as to keep the slot 69 parallel to the axle 52. It will readily be understood from the description of the previous embodiment that as the wheel 51 rotates, the element 65 will not rotate with it, this rotation being prevented by the engagement of the pin 67 with the bracket 70, but the element 65 will gyrate or change its axis in the manner described above, owing to the fact that its axis moves in the path of a cone surface during each rotation of the wheel 51.

On the inner side of the races 63 and 65 I freely mount upon the axle housing 55 a sleeve 71. From opposite sides of the sleeve 71 project outwardly in the radial direction shafts 72 which may suitably be in the form of bolts threaded into the openings in the sleeve 71. These bolts serve to mount the inner races 73, as shown in Fig. 5, upon the sleeve 71. Spacing blocks 74 locate the races 73 at the proper distance outwardly from the sleeves 71 to bring the races 75 outwardly to a position where they may make contact with the races 65 and 76. The races 75 are carried on the races 73 by means of balls 77. The race 76 is carried by means of balls 78 upon the stationary race 79, which is keyed, or otherwise rigidly secured, to the axle housing 55. The elements 65 and 76 are spaced apart in the longitudinal direction of the housing 55 so that the diametrically opposite races 75 are located approximately halfway between the positions of maximum and minimum distance between the races 65 and 76.

It is preferred that the races 75 should have a small degree of back-lash so that one or the other is out of contact with the races 65 and 76. The direction of rotation of the wheel determines which of the races 75 is engaged by the races 65 and 76 and when the direction of the wheel is reversed, the engagement of these races changes from one race 75 to the other race 75. In order to provide for immediate braking, it is obvious that the back-lash should be slight. Means are provided whereby a relatively slight braking action can be applied to the race 76. This means may suitably comprise a brake band 80 provided with an anchor 81 and actuated by a rod 82 in any suitable manner, by a foot or handle control. It will be understood that the particular type of brake mechanism here employed is immaterial, since any means which is capable of applying a slight braking force upon the race 76 is suitable for this purpose.

From the discussion of the previously described embodiment, it will be understood that when the brake band 80 is off, the movement of the race 65, when the wheel 51 rotates, which arises from the slight obliquity of its axis with respect to the axle of the wheel, causes this race to engage one of the races 75 and force it around the axis in a planetary path. Since the race 65 is held against rotation by the bracket 70, the race 75 rolls upon its surface. This rolling causes the race 76 to rotate freely. When the brake band 80 is tightened, this free rotation is impeded to a greater or less degree and the force thus applied is multiplied many times due to the slight angle which the race 65 has with respect to the race 76. The smaller this angle, the greater is the factor by which the braking force is multiplied.

If the race 76 is held against rotation, the race 76 becomes immediately jammed between the races 65 and 76 and the wheels become locked. In other words, the race 65, race 76 and intermediate race 75 become a locked system incapable of independent movementt. This system is held against rotation by the engagement of the bolt 67 with the bracket 70. The brake band 80 assists to a slight degree in preventing rotation of this system, but this force is very slight and ordinarily it is inadequate to exert a direct braking effect upon the automobile. As indicated above, the force thus applied to the race 76 is multiplied many times in braking effect, owing to the slight angularity between the two races 65 and 76.

Although the invention has been disclosed in connection with the specific details of preferred embodiments thereof, it must be understood that such details are not intended to be limitative of the invention except in so far as set forth in the accompanying claims.

Having thus described my invention, what I claim as new and desire to secure by Letters Patent of the United States is:

1. Mechanism for brakes and clutches comprising two elements having axes located at a small angle, a planetary member adapted to be engaged between said two elements to rotate therebetween, means restraining the movement of one of said elements and operative means for restraining and releasing the other element at will.

2. Mechanism for brakes and clutches comprising two elements having axes located at a small angle, whereby one moves its axis in a conical path, a rotary member engaging said elements caused to move in planetary fashion ahead of diverging faces of said elements with resulting rotation of said member, the other element being capable of free rotation by said member, and operative means for restraining the rotation of last said element.

3. Mechanism for brakes and clutches comprising a shaft, an element mounted thereon for rotation on a fixed axis, a rotary member having a fixed axis, an element mounted thereon for free relative rotation of the rotary member, said element being mounted on an axis located at a small angle relative to the axis of the rotary member whereby the axis of said element is caused to move in a conical path during the rotation of the rotary member, means restraining the movement of said element relative to said member, a wheel member mounted for free rotation, means carrying said wheel planetary fashion between said elements, and means for restraining the movement of the first said element.

4. Mechanism for brakes and clutches comprising a shaft, an element mounted thereon for rotation on a fixed axis, a rotary member having a fixed axis, an element mounted thereon for free relative rotation of the rotary member, said element being mounted on an axis located at a small angle relative to the axis of the rotary member whereby the axis of said element is caused to move in a conical path during the rotation of the rotary member, means for preventing rotation of said element, a wheel member mounted for free rotation, means carrying said wheel planetary fashion between same elements, and an operative friction member for impeding the movement of the first said element.

5. A clutch between driving and driven elements comprising a supporting member on one element, an annular member mounted thereon for free relative rotation of the element, means on the other element engaging said annular member to cause said member and said element to rotate together, an annular member mounted for free rotation in spaced relation to and in substantial alignment with the first said annular member, operable frictional means for applying a braking force on last said annular member, said annular members being located out of parallelity by a small angle, and a wheel mounted for planetary and rotary movement and adapted to be engaged between said members.

6. A clutch between driving and driven elements comprising a supporting member on one element located with its axis at a small angle to the axis of the element, an annular member mounted thereon for free relative rotation of the element, means on the other element engaging said annular member to cause said member and said element to rotate together, an annular member mounted on said shaft for free rotation thereon in spaced relation to, and in substantial alignment with the first said annular member, operable means for providing a frictional connection between the last said member and said shaft, said annular members being located out of parallelity by a small angle, and a wheel mounted for planetary and rotary movement and adapted to be engaged between said members.

7. A brake for a vehicle wheel comprising a member freely rotatable on said wheel, a member freely rotatable on said vehicle, said members being in spaced relation and arranged out of parallelity by a small angle, a freely rotatable wheel mounted therebetween for planetary and rotary motion in contact with said members, means for preventing rotation of one member relative to the vehicle, and means for applying a braking force upon the other member.

8. A brake for a vehicle wheel comprising a member freely rotatable on said wheel on an axis at a small angle to the axis of the wheel, a member freely rotatable on said vehicle about the axis of the wheel, said members being in spaced relation, a freely rotatable wheel mounted therebetween for planetary and rotary motion in contact with said members, means for preventing rotation of one member relative to the vehicle, and means for applying a braking force upon the other member.

9. A brake for a vehicle wheel comprising a member freely rotatable on said wheel on an axis at a small angle to the axis of the wheel, means for preventing rotation of said member relative to the vehicle, a member freely rotatable on said vehicle about the axis of the wheel, a brake for restraining the rotation of the last said member, said members being in spaced relation, and a freely rotatable wheel mounted therebetween for planetary and rotary motion in contact with said members.

WILLIAM N. BOLLER.